United States Patent [19]

Inoue

[11] Patent Number: 4,743,074

[45] Date of Patent: May 10, 1988

[54] ANTI-SQUEAL BRAKING SYSTEM FOR AUTOMOTIVE VEHICLE

[75] Inventor: Hideo Inoue, Kanagawa, Japan

[73] Assignee: Toyota Jidosha Kabushiki Kaisha, Aichi, Japan

[21] Appl. No.: 932,498

[22] Filed: Nov. 20, 1986

[30] Foreign Application Priority Data

Nov. 25, 1985 [JP] Japan ................................. 60-264175

[51] Int. Cl.⁴ ........................... B60T 8/58; B60T 8/64; F16D 65/14
[52] U.S. Cl. ................................ 303/100; 188/106 P; 303/110; 303/113
[58] Field of Search ......................... 73/647, 648, 649; 188/1.11, 73.35, 73.36, 73.37, 106 P; 303/2, 6 R, 20, 93, 94, 100, 109, 110, 111, 113

[56] References Cited

U.S. PATENT DOCUMENTS

| | | | |
|---|---|---|---|
| 2,402,115 | 6/1946 | Levy | 188/106 P |
| 3,630,578 | 12/1971 | Kaiser | 303/100 |
| 4,521,856 | 6/1985 | Phelps et al. | 303/94 |
| 4,602,702 | 7/1986 | Ohta et al. | 188/106 P |
| 4,630,871 | 12/1986 | Imoto et al. | 303/113 |
| 4,658,939 | 4/1987 | Kircher et al. | 303/20 |

FOREIGN PATENT DOCUMENTS

54030 10/1979 Japan .

Primary Examiner—Andres Kashnikow
Assistant Examiner—Timothy Newholm
Attorney, Agent, or Firm—Parkhurst & Oliff

[57] ABSTRACT

An anti-squeal braking system for an automotive vehicle, including a first brake having a brake rotor, a friction member disposed opposite to the brake rotor, and a hydraulically operated actuator for forcing the friction member against the brake rotor, and further including a second brake cooperating with the first brake to apply a brake to the vehicle. The first and second brakes are controlled by an anti-squeal controller such that the first brake is operated without a braking squeal, while the second brake is operated so as to provide a braking effect equal to a difference between an actual braking effect applied to the vehicle by the first brake, and a desired braking effect that should be applied to the vehicle. The desired braking effect is predetermined corresponding to an operation value of an operator-controlled brake operating member sensed by a detector device.

6 Claims, 4 Drawing Sheets

| F    | P1      | P2      |
|------|---------|---------|
| F1   | P1(1)   | P2(1)   |
| F2   | P1(2)   | P2(2)   |
| F3   | P1(3)   | P2(3)   |
| ⋮    | ⋮       | ⋮       |
| ⋮    | ⋮       | ⋮       |
| Fn-1 | P1(n-1) | P2(n-1) |
| Fn   | P1(n)   | P2(n)   |

ANTI-SQUEAL BRAKING SYSTEM FOR AUTOMOTIVE VEHICLE

BACKGROUND OF THE INVENTION

1. Field of the Invention

The present invention relates in general to a braking system for automotive vehicles such as four-wheel automobiles, two-wheel motor cycles or various vehicles or trucks for industrial purposes. More particularly, the invention is concerned with an anti-squeal braking system capable of preventing a brake squeal.

2. Discussion of the Prior Art

As a device for applying a brake to a vehicle, there are widely used friction brakes such as a disc brake or drum brake, wherein a friction member is forced against a rotating brake rotor, by a hydraulically operated actuator, so as to restrain the rotation of the brake rotor.

Such friction brakes tend to easily produce an unfavorable high-pitched noise, generally called "squeal" in the art, upon brake application. To prevent this squeal, various solutions have been proposed. For example, Laid-Open Publication 54-156079 (issued in 1979) of Japanese Utility Model Application discloses an anti-squeal shim which is interposed between a friction member and an actuator of a friction brake. Another typical solution to the sqealing of the friction brake is the use of a specially designed lining on a friction member, which exhibits friction characteristics suitable for avoiding the generation of a squeal. Both solutions indicated above are considerably effective to prevent the friction brakes from squealing.

However, the use of an anti-squeal shim or specially designed brake lining as presently available is not considered a completely satisfactory solution to the "squeal" problem of the friction brakes. In addition, the use of an anti-squeal shim may cause another inconvenience, that is, deteriorated operating feel of the brake, and increased possibility of a "brake drag" (a phenomenon in which the friction member remains in contact with the brake rotor after a fluid pressure is released from the actuator). It is understood that the use of a friction member having a comparatively low friction coefficient is effective to avoid the squealing of the friction brake. In this case, however, the braking effect per unit pressure of the actuator is lowered, whereby the force required to operate the actuator for providing a sufficient braking effect is accordingly increased. This means the need of using a large-capacity booster between the brake operating member such as a brake pedal, and a hydraulic pressure source such as a master cylinder to operate the brake actuator. Another drawback encountered in solving the squeal problem by using a specially designed friction member is derived from the fact that the friction coefficient of the friction member is varied with the operating temperature. Therefore, it is impossible that a specially designed friction member is effective to eliminate a brake squeal under any operating conditions of the friction brake.

SUMMARY OF THE INVENTION

It is accordingly an object of the present invention to provide an anti-squeal braking system for an automotive vehicle, equipped with means for effectively preventing a brake squeal, without suffering from the drawbacks discussed above.

The above object may be achieved by the present invention which provides an anti-squeal braking system for an automotive vehicle, comprising: (a) an operator-controlled brake operating member; (b) a detector device for detecting an operation value of the brake operating member; (c) a first brake including a brake rotor, a friction member disposed opposite to the brake rotor, and a hydraulically operated actuator for forcing the friction member against the brake rotor, and thereby restraining rotation of the brake rotor; (d) a second brake cooperating with the first brake to apply a brake to the vehicle; and (e) a control system connected to the detector device, and the first and second brakes, for controlling the first brake so as to be operated without a brake squeal, and controlling the second brake so as to be operated to provide a braking effect equal to a difference between an actual braking effect applied to the vehicle by the first brake, and a desired braking effect that should be applied to the vehicle, the desired braking effect being predetermined corresponding to the operation value of the brake operating member detected by the detector device.

In the anti-squeal braking system of the present invention constructed as described above, the first brake which is a friction brake having the friction member is controlled by the control system, so as to be activated without producing a squeal sound. That is, the fluid pressure in the first brake is reduced to prevent the first brake from producing a squeal sound. A shortage of the braking force or braking effect due to this reduction in the fluid pressure in the first brake is compensated for by an increase in the fluid pressure in the second brake. Thus, the control system controls the first and second brakes so as to prevent the generation of a squeal by the first brake, while maintaining the desired braking force or effect by increasing the braking force of the second brake as needed.

Generally, a friction brake tends to produce a squeal when the fluid pressure in the actuator is relatively low. The range of the fluid pressure in the brake actuator in which the friction brake is likely to squeal is almost fixed, though it differs depending upon the rotating speed of the brake rotor, operating frequency of the brake, wear condition of the friction member of the brake, and other conditions. Therefore, it is possible to avoid a brake squeal by inhibiting the actuation of the first brake when the actuator pressure falls within the fixed range indicated above.

According to one feature of the present invention, the anti-squeal braking system further comprises a squeal-detecting device operable to generate a squeal signal indicative of the brake squeal of the first brake or ultrasonic waves that are generated prior to the generation of the brake squeal. In response to the squeal signal, the control system changes operating conditions of the first and second brakes. Described more specifically, the operating condition of the first brake is changed so that the first brake is less likely to squeal, and at the same time the operating condition of the second brake is changed so that the braking force of the second brake cooperates with the reduced braking force of the first brake, to provide the desired or required braking effect which is determined depending upon the specific operation value of the brake operating member.

According to another feature of the invention, the control system comprises a memory which stores a control pattern data representative of non-squeal operating conditions of the first brakes in which the first brakes are operated without the brake squeal. The non-squeal operating conditions are predetermined corresponding to the operation value of the brake operating member. In this case, the control system controls the first and second brakes according to the control pattern data, without relying on a squeal signal from a squeal-detecting device as indicated above. Stated differently, the control pattern data may represent conditions in which the first brake is not likely to squeal. These conditions may be obtained by performing braking tests under different conditions. The anti-squeal control pattern of the first and second brakes may be prepared based on the test results, so that the first brake is not operated, or is operated so as to prevent a squeal when the squeal conditions are satisfied.

According to a further feature of the invention, the instant braking system further comprises a braking-effect detecting device for detecting an actual braking effect applied to the vehicle. In this case, the control system controls the first and second brakes so that the actual braking effect detected by the braking-effect detecting device is equal to the desired braking effect predetermined corresponding to the operation value of the brake operating member. The instant arrangement permits a constant braking effect for a given operation value of the brake operating member, irrespective of changes in the friction coefficient of the friction member, load condition of the vehicle, and other parameters of the vehicle.

According to a still further feature of the invention, the second brake includes another friction member, and another hydraulically operated actuator for forcing this additional friction member against the brake rotor or another brake rotor to apply brake to the vehicle. The friction member of the second brake has a lower friction coefficient than the friction member of the first brake. Alternatively, the second brake may be a regenerative brake or other brake which is less likely to squeal, than a friction brake. In either case, the anti-squeal control according to the invention may be facilitated.

According to a yet further feature of the invention, the first and second brakes are operated independently of each other, by fluid pressures generated by two mutually independent hydraulic pressure sources. Alternatively, the second brake may be an electromagnetic or regenerative brake. In this case where the first and second brakes are mutually independent, the safety of the vehicle is improved, since one of the two brakes is normally operable even if the other brake fails to operate.

In accordance with another feature of this invention, the anti-squeal braking system further comprises a speed sensor for generating a speed signal indicative of a rotating speed of a wheel of the vehicle for which the first and second brakes is provided, and an anti-skid controller connected to the first and second brakes and the speed sensor, for estimating a slip ratio of the wheel of the vehicle based on the speed signal generated by the speed sensor, determining whether the estimated slip ratio exceeds a predetermned upper limit, and controlling the first brake, if the estimated slip ratio of the wheel has exceeded the upper limit, so as to lower a fluid pressure in the first brake to a level at which the slip ratio is in a predetermined optimum range. The anti-skid controller subsequently controls a brake force of the second brake, so as to maintain the slip ratio within the predetermined optimum range. In this instance, the anti-squeal control and the braking-effect control achieved by the control system are interrupted when the anti-skid controller starts to operate.

BRIEF DESCRIPTION OF THE DRAWINGS

The foregoing and optional objects, features and advantages of the present invention will be better understood by reading the following detailed description of a preferred embodiment of the invention, when considered in connection with the accompanying drawings, in which.

DETAILED DESCRIPTION OF THE PREFERRED EMBODIMENT

Figure 1:
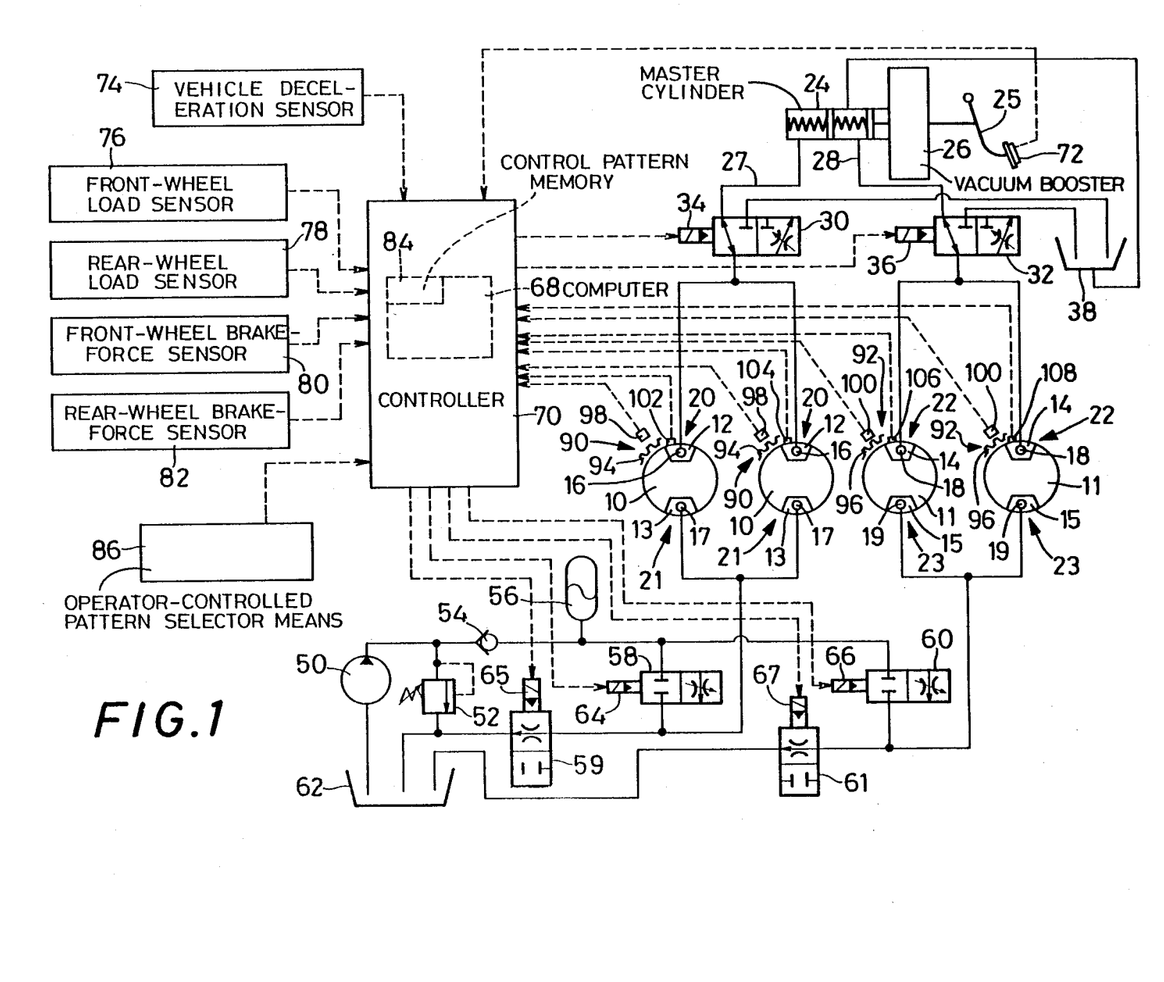
FIG. 1 is a schematic diagram showing one embodiment of an anti-squeal braking system of the present invention for an automotive vehicle.

Referring first to FIG. 1, two pairs of circles indicated by reference numerals 10, 11 represent corresponding two pairs of disc rotors. The two disc rotors 10 are respectively attached to a left-front and a right-front wheel of a four-wheel automative vehicle, while the two disc rotors 11 are respectively attached to a left-rear and a right-rear wheel of the vehicle. Each of the front disc rotors 10 is equipped with a pair of calipers 12, 13. Similarly, each of the rear disc rotors 11 is equipped with a pair of calipers 14, 15. Each of the calipers 12, 13, 14, 15 has a brake cylinder 16, 17, 18 or 19. With a hydraulic pressure applied to each of these brake cylinders, a pair of friction members or brake pads disposed opposite to the rotor 10, 11 are forced against the opposite friction surfaces of the corresponding disc rotor 10, 11, whereby the rotating motions of the disc rotors and consequently the corresponding wheels are restrained. Thus, a brake is applied to the vehicle. The calipers 12, 13, 14 and 15 are equipped with the brake cylinders 16, 17, 18 and 19 constitute a hydraulically operated actuator. Brakes having the brake cylinder 16 are referred to as first front-wheel brakes 20, while brakes having the brake cylinder 17 are referred to as second front-wheel brakes 21. Similarly, brakes having the brake cylinder 18 are referred to as first rear-wheel brakes 22, while brakes having the brake cylinder 19 are referred to as second rear-wheel brakes 23. The brake pads or friction members of the first front-wheel and rear-wheel brakes 20, 22 have an ordinary organic lining which is designed to provide a comparatively high braking effect. On the other hand, the brake pads or friction members of the second front-wheel and rear-wheel brakes 21, 23 use an organic lining which contains a larger amount of a lubricant such as carbon black and graphite, than the ordinary organic lining, so that the friction coefficient of the brake pads is reduced for effectively preventing the second brakes 21, 23 from generating a brake squeal during operation.

The brake cylinders 16, 18 of the first front-wheel and rear-wheel brakes 20, 22 are supplied with a pressurized fluid generated by a master cylinder 24. An operator-controlled brake operating member in the form of a brake pedal 25 is connected via a vacuum booster 26 to the master cylinder 24. An operating force or depression force exerted to the brake pedal 24 by the vehicle operator is boosted by the vacuum booster 26, and the boosted force is imparted to the master cylinder 24. As a result, the same level of fluid pressure is generated in two mutually independent pressure chambers of the master cylinder 24. The fluids pressurized in the two pressure chambers are delivered to the brake cylinders 16 of the first front-wheel brakes 20, and to the brake cylinders 18 of the first rear-wheel brakes 22, through corresponding conduits 27, 28, and through corresponding solenoid-operated control valves 30, 32, respectively. Normally, the solenoid-operated control valves 30, 32 are placed in their first position shown in FIG. 1, in which the master cylinder 24 is held in communication with the brake cylinders 16, 18. With controlled amounts of an electric current applied to solenoids 34, 36, the control valves 30, 32 are placed in their second position for communication of the brake cylinders 16, 18 with a reservoir 38. Namely, the control valves 30, 32 in the second position allow the pressurized brake fluid in the brake cylinders 16, 18 to be discharged into the reservoir 38, at flow rates determined by the amount of electric currents applied to the respective solenoids, 34, 36. The brake cylinders 16, 18 of the first front-wheel and rear-wheel brakes 20, 22 are designed so as to produce a braking effect which is smaller than an optimum or desired braking effect that is predetermined corresponding to the specific operation or depression force exerted on the brake pedal 25.

On the other hand, the brake cylinders 17, 19 of the second front-wheel and rear-wheel brakes 21, 23 are supplied with a pressurized fluid delivered from a hydraulic pressure source, which includes a hydraulic pump 50, a relief valve 52, a check valve 54 and an accumulator 56. The flow of the fluids to and from the brake cylinders 17, 19 are controlled by a pair of solenoid-operated control valves 58, 59, and a pair of solenoid-operated control valves 60, 61, respectively. These control valves 58, 59, 60 and 61 are normally placed in their first position of FIG. 1, in which the brake cylinders 17, 19 are disconnected from the hydraulic pressure source, and are held in communication with a reservoir 62. With controlled amounts of an electric current applied to respective solenoids 64, 65, 66, 67, the control valves 58–61 are placed in their second position in which the brake cylinders 17, 19 are disconnected from the reservoir 62, and are held in communication with the pressure source, so that the fluid pressures in the brake cylinders 17, 19 are raised. The rate of rise in the fluid pressure may be changed by adjusting the amounts of electric current to the solenoids 64, 66.

The supply of an electric current to the solenoids 34, 36, 64, 65, 66 and 67 is controlled by a controller 70 which is mainly constituted by a compact 68. To the controller 70 is connected a pressure sensor 72 disposed on a pedal pad of the brake pedal 25. This pressure sensor 72 serves as a detecting device for detecting an operation force exerted to the brake operating member in the form of the brake pedal 25. There is also connected to the controller 70 a vehicle deceleration sensor 74 which is adapted to generate an electric signal indicative of a rate of deceleration (or acceleration) of the vehicle. The deceleration sensor 74 serves as a braking-effect detecting device for detecting an actual braking effect applied by the braking system to the vehicle.

Also connected to the controller 70 are: a front-wheel load sensor 76 which detects a load applied to the front wheels; a rear-wheel load sensor 78 which detects a load applied to the rear wheels; a front-wheel brake-force sensor 80 which detects a brake force produced by the front wheels; and a rear-wheel brake-force sensor 82 which detects a brake force produced by the rear wheels. For instance, the front-wheel and rear-wheel load sensors 76, 78 may consist of sensors of a type which detects a relative displacement between the corresponding axle and the body of the vehicle, that occurs due to a change in the amount of elastic deformation of suspension springs, depending upon varying loads applied to the pairs of front and rear wheels. As the front-wheel and rear-wheel brake-force sensors 80, 82, it is possible to use strain gauges arranged to detect forces exerted to the brackets that support the calipers 12, 13, and 14, 15, upon brake application.

Figure 2:
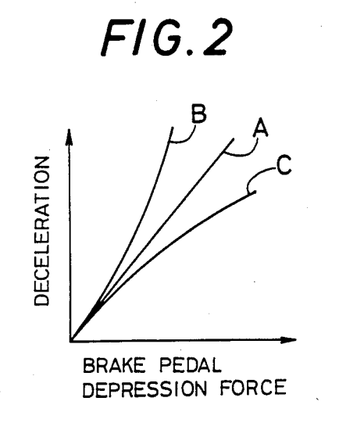
FIGS. 2, 3 and 4 are graphs which show control patterns stored in a control pattern memory of the braking system of FIG. 1.
Figure 3:
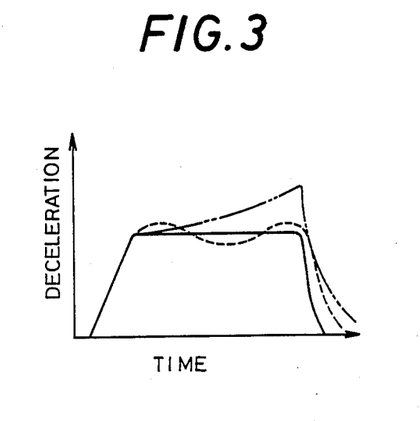
Figure 4:
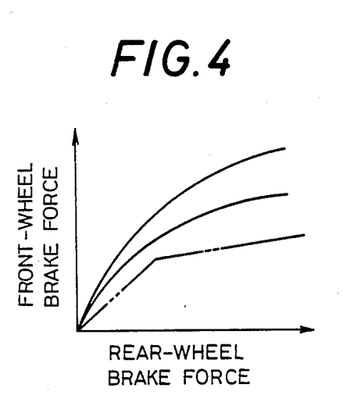

The computer 68 of the controller 70 incorporates a control pattern memory 84 which is adapted to store various control pattern data as indicated in solid lines in FIGS. 2 through 4. Lines A, B and C shown in FIG. 2 indicate braking-effect control patterns representative of different relations between the operation force exerted to the brake pedal 25, and the desired rate of deceleration of the vehicle, i.e., desired braking effect to be applied to the vehicle. Line A indicates a most commonly used braking effect pattern in which the deceleration rate or braking effect increases in proportion to the operating force applied to the brake pedal 25. Line B shows a braking effect pattern wherein the rate of increase in the deceleration rate increases as the operating force acting on the brake pedal 25 increases. This pattern gives the vehicle driver a "sporty" braking feel. Line C represents a pattern in which the rate of increase in the deceleration rate decreases with an increase in the operating force on the brake pedal 25. This pattern produces a '37 smooth" braking effect, permitting a better vehicle deceleration comfort. The vehicle driver may select a desired one of the three patterns A, B and C, with operator-controlled pattern selector means in the form of a selector 86 which is connected to the controller 70.

The graph of FIG. 3 shows a timing control pattern indicative of a relation between a time lapse between the commencement of brake application to the vehicle, and the desired deceleration rate of the vehicle (desired braking effect). Generally, the deceration rate of the vehicle upon each brake application is varied as a function of time as indicated in two-dot chain line or dashed line in FIG. 3, due to a change of the friction coefficient of the brake pads or other charging parameters, even if the operation force action on the brake pedal 25 is kept constant. However, the control pattern memory 84 stores the relation as indicated in solid line in the figure. As a matter of course, it is possible to use other deceleration-time relations wherein the deceleration rate varies as a function of time, to produce a desired braking effect.

The control pattern memory 84 further stores a plurality of brake force distribution control patterns, as shown in solid lines in FIG. 4 by way of examples. Each control pattern represents a desired relation between a sum of brake forces applied to the front wheels and a sum of brake forces applied to the rear wheels. The control patterns are provided corresponding to different load conditions of the vehicle. Controlling the ratio of brake forces of the front wheels to the rear wheels according to the selected one of the control patterns, will avoid a decrease in the straight-line running stability of the vehicle, due to skidding of the front wheels prior to that of the rear wheels, or vice versa. Conventionally, a proportioning valve is used with or without a load sensor, for example, to control the fluid pressures in the rear-wheel brakes, in order to provide a front-rear brake force distribution as indicated in two-dot chain line in FIG. 4. However, a brake force produced by a brake is determined by a friction coefficient of the friction pads, as well as a pressure level of the fluid in the brake. It is inevitable that the friction coefficient of the friction pads is varied over a considerably wide range. Accordingly, it has been difficult to provide an ideal distribution of brake forces between the front and rear brakes. Further, the use of a proportioning valve with a load sensor suffers from extreme difficulty in adjusting the load sensor during installation on the vehicle. According to the present braking system of the invention, the controller 70 is adapted to detect a load condition of the vehicle based on the signals generated by the load sensors 76, 78, and select one of the distribution patterns which suits the detected load condition of the vehicle. The fluid pressures in the brake cylinders 17, 19 of the second front-wheel and rear-wheel brakes 21, 23 are controlled according to the selected distribution pattern, so that the brake forces applied to the front wheels are changed in a suitable proportion to the brake force applied to the rear wheels.

The vehicle is provided with two front-wheel speed sensors 90 for the front wheels, and two rear-wheel speed sensors 92 for the rear wheels. These spaced sensors 90, 92 detect the rotating speeds of the corresponding wheels. Each of the speed sensors 90, 92 has a gear 94 or 96 rotatable with the corresponding wheel, and a detecting head 98 or 100 disposed adjacent to the gear 94, 96 for detecting the passage of teeth of the gear during rotation of the wheel. Front-wheel speed signals and rear-wheel speed signals produced by the speed sensors 90, 92 are fed to the computer 68 of the controller 70.

Figure 6:
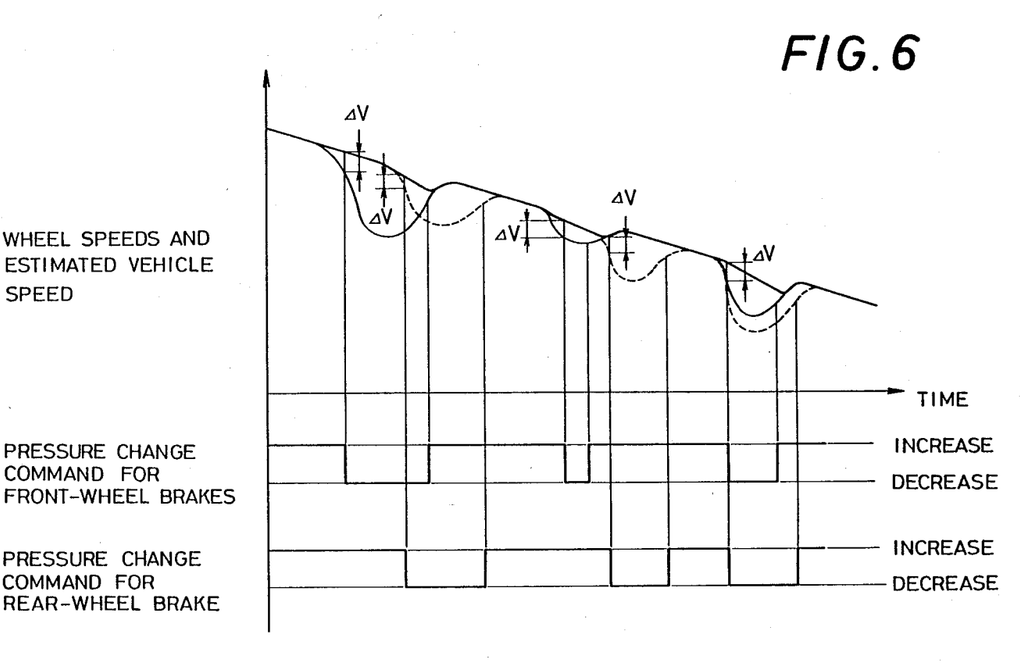
FIG. 6 is a diagrammatic view explaining an anti-skid control operation of the braking system shown in FIG. 1.

For effecting an anti-skid control operation of the braking system as illustrated in FIG. 6, the computer 68 uses one of the two front-wheel speed signals of the speed sensors 90, which represents the higher one of the rotating speeds of the two front wheels, and one of the two rear-wheel speed signals of the speed sensors 92, which represents the lower one of the rotating speeds of the two rear wheels. In FIG. 6, the thin solid line represents the higher rotating speed of one of the front wheels, and the dashed line represents the lower rotating speed of one of the rear wheels. These two speeds are considered as the speeds of the front and rear wheels, respectively. Thick solid line represents a running speed of the vehicle (expressed by rotating speed of the wheels) which is estimated by the computer 68, on the assumption that "one of the rotating speeds of the front and rear wheels which is higher than the other represents the running speed of the vehicle, and the deceleration rate of the vehicle cannot exceed 1.15G". The computer 68 calculates a deviation of the speed of each wheel from the estimated vehicle running speed, in order to initiate an anti-skid control of the braking system by means of the solenoid-operated control valves 30, 32, 58, 59, 60 and 61, if the calculated deviation or difference exceeds a predetermined limit. Thus, the controller 70 whose major part is constituted by the computer 68 serves as an anti-skid controller for controlling the control valves 30, 32, 58–61 to effect the anti-skid control operation which will be described.

Four ultrasonic wave sensors 102, 104, 106 and 108 are connected to the controller 70. These sensors 102, 104, 106 and 108 are disposed in the vicinity of the two first front-wheel brakes 20, 20, and the two first rear-wheel brakes 22, 22, respectively, so that the sensors detect ultrasonic waves of the audio-frequency band which are produced immediately before the first brakes 20, 22 generate a brake squeal. The ultrasonic wave sensors 102, 104, 106, 108 generate a squeal signal indicative of the brake squeal, which is fed to the computer 68 of the controller 70. The sensors 102, 104, 106 and 108 constitute a squeal-detecting device for detecting the condition in which a brake squeal will be generated by the first brakes 20, 22.

The operation of the present braking system will be described.

When a key switch of the vehicle is turned on, power is applied to the controller 70, and the computer 68 is automaticaly initialized. More specifically, various counters, flags, memorys, etc. are set, reset or cleared to their initial positions. For example, the braking effect pattern (deleration-brake pedal depression curve) A of FIG. 4 is selected as an initially set pattern. If needed, the vehicle driver may replace the initially set pattern A by another control pattern B or C, by operating the selector 86 after the initialization of the computer 68 is terminated. By way of illustration, the operation of the braking system will be described, assuming that the braking-effect control pattern B has been selected by the vehicle driver.

While the output signal of the vehicle deceleration sensor 74 is indicating substantially no deceleration or acceleration of the vehicle, the computer 68 determines the load condition of the vehicle based on the output signals received from the front-wheel and rear-wheel load sensors 76, 78. Based on the determined load condition, the computer 68 selects the appropriate one of the brake-force distribution control patterns as shown in FIG. 4. The above steps are repeated while the vehicle is running at a constant speed. When a rate of deceleration or acceleration of the vehicle exceeding a predetermined limit is detected, the above steps of operation are interrupted.

If the brake pedal 25 is depressed while the vehicle is running, the fluid pressure corresponding to the depression force on the pedal 25 is generated in the master cylinder 24. Since the solenoid-operated control valves 30, 32 are normally placed in the first position for communication of the master cylinder 24 with the brake cylinders 16, 18, the pressure of the master cylinder 24 is applied to the brake cylinders 16, 18, whereby the first front-wheel brakes 20, and the first rear-wheel brakes 22 are activated. In the meantime, the computer receives a signal of the pressure sensor 72 indicative of the operating force acting on the brake pedal 25. Based on the signal from the pressure sensor 72, and the braking-effect control pattern B of FIG. 2, the computer 68 obtains a desired rate of deceleration of the vehicle, i.e., a desired braking effect. Then, the computer 68 calculates an actual rate of deceleration of the vehicle based on the output signal of the vehicle deceleration sensor 74. The computer 68 calculates a difference between the desired and actual rates of deceleration, that is, an amount of insufficiency of the actual deceleration with respect to the desired deceleration rate.

In the event that the actual rate of deceleration by activation of the first brakes 20, 22 is higher than the desired rate of deceleration due to rust on the disc rotors 10 and/or 11, for example, the computer 68 commands the solenoid-operated control valves 30, 32 of the first brake system so that the deceleration rate obtained by the first brakes 20, 22 is reduced to the desired deceleration rate.

Further, the computer 68 calculates actual brake forces applied to the front and rear wheels, based on the output signals of the front-wheel and rear-wheel brake-force sensors 80, 82. The brake forces produced by the first front-wheel brakes 20 and the first rear-wheel brakes 22 are determined according to the selected brake-force distribution control pattern of FIG. 4. However, it is inevitable that the actual distribution between the front and rear brake forces more or less deviates from the desired or ideal distribution represented by the control pattern. In view of this tendency, the computer 68 calculates the fluid pressures to be applied to the second front-wheel brakes 21 and the second rear-wheel brakes 23, based on the obtained amount of insufficiency of the actual deceleration and the amount of deviation of the brake force distribution between the front and rear wheels. Based on the calculated fluid pressures, the computer 68 determines the amount of electric current to be applied to the solenoids 64, 66 and to the solenoids 65, 67. With the determined electric currents applied to these solenoids, the second brakes 21, 23 are operated in order to increase the brake forces for the front and rear wheels.

In the next control cycle, the actual vehicle deceleration rate, and the actual brake forces for the wheels, are again detected by the vehicle deceleration sensor 74, and the front-wheel and rear-wheel brake-force sensors 80, 82, and the above-indicated control cycle is repeated so as to control the actual deceleration rate of the vehicle, substantially in accordance with the desired deceleration rate, while maintaining the distribution rate of the front and rear brake forces at an optimum value that suits the current load condition of the vehicle. Of course, the supply of the electric current to the solenoids 65, 67 is cut off to reduce the fluid pressures in the brake cylinders 17, 19, if the brake forces produced by the second brakes 21, 23 have exceeded the desired values. In this case, the supply of the electric current to the solenoids 64, 66 may also be cut off if desired.

Figure 5:
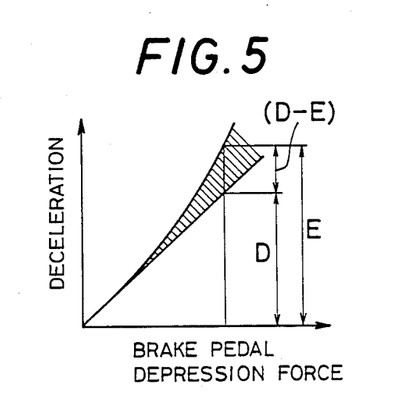
FIG. 5 is an explanatory graphical representation illustrating braking effects (deceleration rates of the vehicle) produced by a first and a second brake of the braking system.

It will be understood from the foregoing description that the second brakes 21, 23 are operated to produce a braking effect (an amount of deceleration) equal to a difference (D−E) between a deceleration rate D obtained by the first brakes 20, 22, and the desired deceleration rate E, as shown in FIG. 5. Therefore, the solenoid-operated control valves 58-61 of the second brakes 21, 23, and the second-brake controller 70 for the control valves, can serve their function if these members are capable of compensating for a relatively small portion of the desired deceleration amount indicated by hatched area in FIG. 5. The above control of the second brakes 21, 23 will be referred to as "braking-effect control function".

When the first and second brakes 20, 22, 21, 23 are operated as described above, the second brakes 21, 23 are less likely to produce a squeal sound since the linings of the friction pads have a comparatively low coefficient of friction. On the other hand, the first brakes 20, 22 may possibly generate a squeal sound, since the linings of their friction pads have a comparatively high friction coefficient for providing a relatively high braking effect.

In the present embodiment, however, the ultrasonic wave sensors, 102, 104, 106, 108 sense ultrasonic waves which are generated immediately before any one of the first brakes 20, 22 starts to produce a brake squeal. In this event, the squeal signal indicative of such ultrasonic waves produced by the ultrasonic wave sensors is received by the controller 70, as an interruption signal to interrupt the control operation of the computer 68. In response to the interruption signal, the computer 68 applies a predetermined amount of electric current to the solenoid 34 or 36 of the appropriate solenoid-operated control valve 30 or 32, for a predetermined length of time, in order to reduce the fluid pressure in the first brake 20, 22 which is going to produce a squeal sound. As a result, the braking condition in the first brake 20, 22 is usually changed so as to prevent the first brake in question from producing a squeal sound. If the squeal signal from the ultrasonic wave sensors 102, etc. remains even after the fluid pressure in the first brake in question has been reduced to a lower level, the computer 68 repeats its command to the solenoid-operated control valve 30, 32, to further reduce the fluid pressure in the first brake 20, 22, until the squeal signal becomes absent.

In the above manner, the generation of a brake squeal by the first brakes 20, 22 is avoided. As a result, the total braking force for the vehicle is reduced below the required level. To compensate for a shortage of the braking force due to the anti-squeal control of the first brakes 20, 22, the fluid pressure in the second brakes 21, 23 is increased to an appropriate extent, so that the total braking force or braking effect produced by the first and second brakes 20, 22, 21, 23 coincides with the desired braking force or braking effect predetermined for the foot pressure currently exerted on the brake pedal 25. Thus, the braking system is operated so as to provide the required braking effect, while avoiding the generation of a brake squeal from the first and second brakes 20, 22, 21, 23. The control operation discussed above for controlling the first and second brakes 20, 22, 21, 23 for preventing a brake squeal while mataining a desired braking effect will be referred to as "anti-squeal control function".

The computer 68 repeats calculating a difference (indicative of a slip ratio) between the actual rotating speed of each of the front and rear wheels and the estimated vehicle running speed, based on the speed signals from the speed sensors 90, 92, even while the computer 68 is performing the above-described braking-effect control function and the anti-squeal control function. If the calculated difference exceeds a predetermined value ΔV as indicated in FIG. 6, the computer 68 interrupts the braking-effect control and anti-squeal control functions, and commences an anti-skid control function. Described in more detail, the computer 68 produces pressure decreasing commands to reduce the fluid pressures in the brake cylinders 17 and/or 19 of the second brakes 21, 23, by means of the solenoid-operated control valves 58, 59 and/or 60, 61, for reducing the brake forces of the second brakes 21 and/or 23. The computer 68 produces pressure increasing commands, when the difference between the rotating speeds of the front and/or rear wheels and the estimated running speed of the vehicle has been reduced below the predetermined value ΔV, as a result of the decrease in the fluid pressures in the brake cylinders 17 and/or 19. Consequently, the fluid pressures in these brake cylinders 17 and/or 19 are increased. This pressure decreasing and increasing control of the second brakes 21 and/or 23 is repeated so as to maintain the slip ratios of the front and/or rear wheels within the predetermined optimum range which permits satisfactory running stability and braking efficiency of the vehicle.

In the case where the friction coefficient of the road surface is comparatively low, there is a possibility that the mere reduction of the brake forces of the second front-wheel brakes 21 and/or second rear-wheel brakes 23 does not permit the slip ratios of the wheels to be lowered to a value within the optimum range. Further, if the friction coefficient of the road surface is considerably low, the slip ratios of the front and/or rear wheels may become excessively high, before the second brakes 21, 23 are activated. In such events, the computer 68 first operates the solenoid-operated control valves 30, 32 of the first brakes 20 and/or 22, in order to reduce the slip ratios of the front and/or rear wheels to a level slightly lower than the lower limit of the optimum range. Then, the computer 68 commands the control valves 58, 59 and/or 60,61 to control the fluid pressures in the brake cylinders 17 and/or 19 of the second brakes 21 and/or 23, so as to maintain the slip ratios of the corresponding wheels within the optimum range.

In any case, the anti-skid control of the braking system is accomplished mainly by controlling or changing the fluid pressures in the brake cylinders 17, 19 of the second brakes 21, 23. These changes in the fluid pressures in the brake cylinders 17, 19 will not be transmitted to the master cylinder 24, in the illustrated embodiment, unlike a conventional anti-skid braking system which tends to suffer from deterioration of sealing members of the master cylinder, or undesirable shocks imparted to the brake pedal, due to considerable pressure changes in the master cylinder. In the illustrated embodiment, the solenoid-operated control valves 58, 59, 60 and 61 are adapted to be capable of controlling the fluid flow by means of changing the electric current applied. This control of the electric current to regulate the fluid flow through the control valves assures improved control of the fluid pressures in the brake cylinders, and reduced vibrations transmitted to the vehicle body, as compared with an on-off control of the solenoids to regulate the fluid flow by controlling the duty cycle of the solenoids.

The above description refers to the operation while the first and second brake systems are both in the normal condition. If one of the first and second brake systems fails, a brake can be applied to the vehicle by the normal one of the two systems, since the two brake systems are independent of each other. Thus, the present anti-skid braking system assures safety of the vehicle upon failure of either one of the first and second brake systems.

As is apparent from the foregoing description, the controller 70 incorporating the computer 68 serves as the anti-skid controller previously indicated, as a braking-effect controller for performing the braking-effect control operation, and as an anti-squeal controller for performing the anti-squeal control operation.

While the illustrated embodiment is adapted such that the solenoid-operated control valves 30, 32 are activated only where the first brakes 20, 22 produce excessively large brake forces or are going to generate a squeal sound, it is possible to activate the control valves 30, 32 in other situations, for example, when it is desired to rapidly reduce the braking effect on the disc rotors 10 during an anti-skid control operation.

In the illustrated embodiment, the fluid pressures in the second brakes 21 for the left-front and right-front wheels are changed simultaneously. Similarly, the fluid pressures in the second brakes 23 for the left-rear and right-rear wheels are also changed simultaneously. However, the fluid pressures in the second brakes 21 for the front wheels, or in the second brakes 23 for the rear wheels, may be changed independently of each other. Further, the fluid pressures in all of the four second brakes 21, 23 may be changed independently of each other. In this latter case, it is desirable to provide each of the wheels with a load sensor and a brake force sensor.

The present braking system may employ various control devices or methods known in the art, for preventing skidding of the wheels of the vehicle, provided that these devices and methods are not incompatible with the principle of the anti-squeal control operation of the present invention.

In the illustrated embodiment, the second brakes 21, 23 are controlled according to the predetermined control patterns, i.e., so as to satisfy a relation between the brake pedal operating force and the desired rate of vehicle deceleration, a relation between the desired deleceration rate and time, and a relation between the brake forces of the front wheels and those of the rear wheels, as previously discussed. Further, the illustrated braking system is also adapted to achieve the anti-skid control function. However, the principle of the present invention may be practiced without any or all of these braking-effect and anti-skid control functions which are effected for the purposes other than preventing the generation of brake squeals. The simplest form of the anti-squeal braking system according to the present invention is provided when all of such braking-effect and anti-skid control functions are eliminated. It is possible to modify the controller 70 so that other braking-effect control functions may be additionally achieved, or substituted for the functions performed in the illustrated embodiment. For example, it is possible to activate the second brakes 21, 23 during a temporary stop of the vehicle on a slope, in order to prevent the vehicle from rolling down the slope, or during a temporary stop of the vehicle equipped with an automatic transmission, in order to avoid the vehicle from starting. Further, the braking system may be provided with a traction controller for activating the second brakes when the slip ratios of the drive wheels exceed a predetermined limit when the vehicle is started, or when a difference between the slip ratios of the left and right wheels exceeds a limit, due to a difference of the friction coefficient of the road surfaces.

While the first and second brakes 20, 21 or 22, 23 used in the illustrated embodiment are all hydraulically operated friction brakes, they may be replaced by other types of brakes such as electromagnetic brakes and regenerative brakes.

In the illustrated embodiment, the generation of a brake squeal may be completely avoided since the first brakes 20, 22 are controlled according to the squeal signal generated from the ultrasonic wave sensors 102, 104, 106, 108 which are adapted to detect the phenomenon of the first brakes 20, 22 that indicates the conditions immediately before a squeal sound is produced.

However, the sensors may be adapted to generate a signal as soon as a squeal sound of the audio-frequency has been generated, or detect the beginning of generation of such squeal sound, and reduce the braking forces of the first brakes 20, 22 in response to the signal. This arrangement is capable of substantially preventing the generation of an audible squeal sound. Thus, the object of the present invention is almost achieved. While it is desirable that a squeal-detecting device such as the ultrasonic wave sensors used in the illustrated embodiment be positioned near each of the first brakes 20, 22 for early and reliable detection of a brake squeal, it is possible to use only one detector for all of the first brakes 20, 22. In this case, too, the generation of the squeal may be sensed, and the cost of the braking system is advantageously reduced.

It is also noted that the use of a squeal-detecting device is not essential to the anti-squeal braking system of the present invention. That is, the first and second brakes may be controlled without depending upon the squeal signal from a squeal detector, but according to a suitable control pattern data stored in the control pattern memory 84, which represents non-squeal operating conditions of the first brakes 20, 22 in which the first brakes 20, 22 are operated without a squeal. For instance, it is recognized that a brake squeal is usually easily produced where a light brake is applied while the vehicle is running at a comparatively low speed. Based on this recognition, it is possible for example that only the second brakes which are less likely to produce a squeal are activated when the above-indicated braking condition exists, while the first and second brakes or only the first brakes are activated when the above braking condition does not exist. The above brake control pattern of the first and second brakes, or the non-squeal operating condition of the first brake, are predetermined corresponding to specific operation forces or amounts of the brake pedal 25.

The conditions in which a brake squeal is easily produced differ depending upon the specific brake system employed in each type or model of vehicles. In other words, the non-squeal operating conditions of the braking system of each type of vehicle may be determined by performing braking tests under different conditions. Therefore, suitable control patterns for operating the first and second brakes with a minimum of brake squeal may be prepared according to the determined non-squeal operating conditions, and may be stored as a control map in the control patttern memory 84 of the computer 68.

Figure 7:
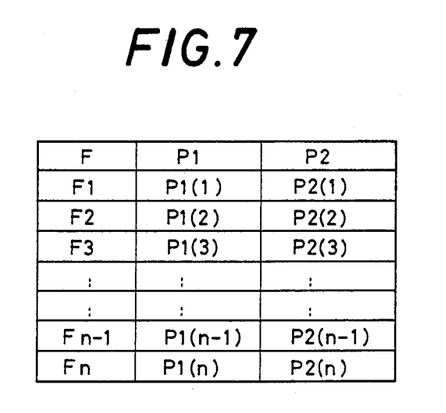
FIG. 7 is a view illustrating a control pattern data representative of non-squeal operating pressures of the first and second brakes, in relation to a brake pedal operating force.

FIG. 7 shows an example of a control pattern data or map stored in the memory 84, which represents the non-squeal brake fluid pressures P1 and P2 to be applied to the first and second brakes, in relation to the operating force F acting on the brake pedal 25, which force F is sensed by the pressure sensor 72. Further, if the non-squeal conditions of the brakes, or the conditions necessary to prevent the generation of a squeal phenomenon, are varied over a relatively wide range depending upon the individual vehicles even of the same type or model, it is recommended to provide an operator-controlled member which enables the vehicle driver to modify or adjust, to some extent, the control pattern in which the first and second brakes are controlled for preventing a brake squeal. In this case, the vehicle driver may select a suitable control mode of the first and second brakes, according to the driver's experience of the condition in which a brake squeal is easily produced.

Although the second brakes 21, 23 of the illustrated embodiment use brake pads suitable for preventing a squeal, this arrangement is not essential to practice the principle of the present invention. While the present invention is most effective where the first brakes used as a primary brake are disc brakes which have a high tendency of producing a squeal, the principle of the invention is applicable to a braking system wherein drum brakes are used as the first or primary brakes, since the drum brakes may more or less suffer from a squeal phenomenon.

In the illustrated embodiment, the pressure sensor 72 is used as a device for detecting an operating force on an operator-controlled brake operating member in the form of the brake pedal 25, it is possible to use a detector which is adapted to sense an operating amount or stroke, or operating time of the brake pedal. Further, the vehicle deceleration sensor 74 used as a braking-effect detector may be eliminated. In this case, the actual braking effect produced by the brakes may be estimated by the controller, based on the signals from pressure sensors adapted to detect the fluid passages in the brakes. It is also possible that the brakes are controlled according to predetermined control patterns wherein the fluid pressures of the individual brakes are determined as a function of the operating force or amount of the brake operating member or brake pedal.

While the present invention has been described in its preferred embodiment with a certain degree of particularity, it is to be understood that the invention is not limited thereto, but may be embodied with various changes, modifications and improvements other than indicated above, which may occur to those skilled in the art, without departing from the spirit and scope of the invention defined in the following claims.

What is claimed is:

1. An anti-squeal braking system for an automotive vehicle, comprising:
   an operator-controlled brake operating member;
   a detector device for detecting an operation value of said brake operating member;
   a first brake including a brake rotor, a friction member disposed opposite to said brake rotor, and a hydraulically operated actuator for forcing said friction member against said brake rotor, and thereby restraining rotation of said brake rotor;
   a second brake cooperating with said first brake to apply a brake to the vehicle;
   a squeal-detecting device operable to generate a squeal signal indicative of one of said brake squeal of said first brake and ultrasonic waves that are generated from said first brake prior to the generation of said brake squeal;
   braking-effect detecting means for detecting an actual braking effect applied to the vehicle; and
   control means for controlling said first and second brakes, said control means being responsive to said detector device, said squeal-detecting device and said braking-effect detecting means, and including determining means for determining a desired braking effect that should be applied to the vehicle when said operation value of said brake operating member is detected by said detector device, said control means controlling said first and second brakes in response to said squeal signal so that said first brake is operated without said brake squeal, and said second brake is operated so as to provide a braking effect equal to a difference between an actual braking effect applied to the vehicle by said first brake, and said desired braking effect determined by said determining means.

2. An anti-squeal braking system according to claim 1, wherein said second brake includes another friction member, and another hydraulically operated actuator for forcing said another friction member against said brake rotor or another brake rotor to apply brake to the vehicle, said another friction member having a lower friction coefficient than the friction member of said first brake.

3. An anti-squeal braking system according to claim 1, wherein said first and second brakes are operated independently of each other, by fluid pressures generated by two mutually independent hydraulic pressure sources.

4. An anti-squeal braking system according to claim 1, further comprising speed sensor means for generating a speed signal indicative of a rotating speed of a wheel of the vehicle for which said first brake and second brake are provided, and an anti-skid controller means connected to said first and second brakes and said speed sensor means, for estimating a slip ratio of said wheel of the vehicle based on said speed signal generated by said speed sensor means, determining whether the estimated slip ratio exceeds a predetermined upper limit, and controlling said first brake, if said estimated slip ratio of the wheel has exceeded said upper limit, so as to lower a fluid pressure in said first brake to a level at which the slip ratio is in a predetermined optimum range, said antiskid controller means subsequently controlling a brake force of said second brake, so as to maintain said slip ratio within said predetermined optimum range, said control means being operable while said anti-skid controller means is not operating, and becoming inoperable when said anti-skid controller means starts to operate.

5. An anti-squeal braking system according to claim 1, further comprising hydraulic pressure source means for generating a fluid pressure to operate said first and second brakes, and said first and second brakes having a first brake cylinder and a second brake cylinder, respectively, said control means comprising first solenoid-operated valve means disposed between said pressure source means and said first brake cylinder, and operable between a first position for communication of said first brake cylinder with said pressure source means, and a second position for communication with said first brake cylinder with reservoir means, said control means further comprising second solenoid-operated valve means disposed between said pressure source means and said second brake cylinder, and operable between a first position for communication of said second brake cylinder with said pressure source means, and a second position for communication with said second brake cylinder with said reservoir means.

6. An anti-squeal braking system for an automotive vehicle, comprising:
an operator-controlled brake operating member;
a detector device for detecting an operation value of said brake operating member;
a first brake including a brake rotor, a friction member disposed opposite to said brake rotor, and a hydraulically operated actuator for forcing a friction member against said brake rotor, and thereby restraining rotation of said brake rotor;
a second brake cooperating with said first brake to apply a brake to the vehicle; and
control means for controlling said first and second brakes and cooperating with said detector device, said control means including a memory which stores a control pattern data representative of non-squeal operating conditions of said first brake in which said first brake is operated without a brake squeal, said control pattern data being predetermined corresponding to said operation value of said brake operating member detected by said detector device, said control means controlling said first and second brakes in cooperation to provide a desired braking effect that should be applied to the vehicle when the operation value of said brake operating member is detected, said control means controlling said first and second brakes according to said control pattern data stored in said memory.

* * * * *